UNITED STATES PATENT OFFICE.

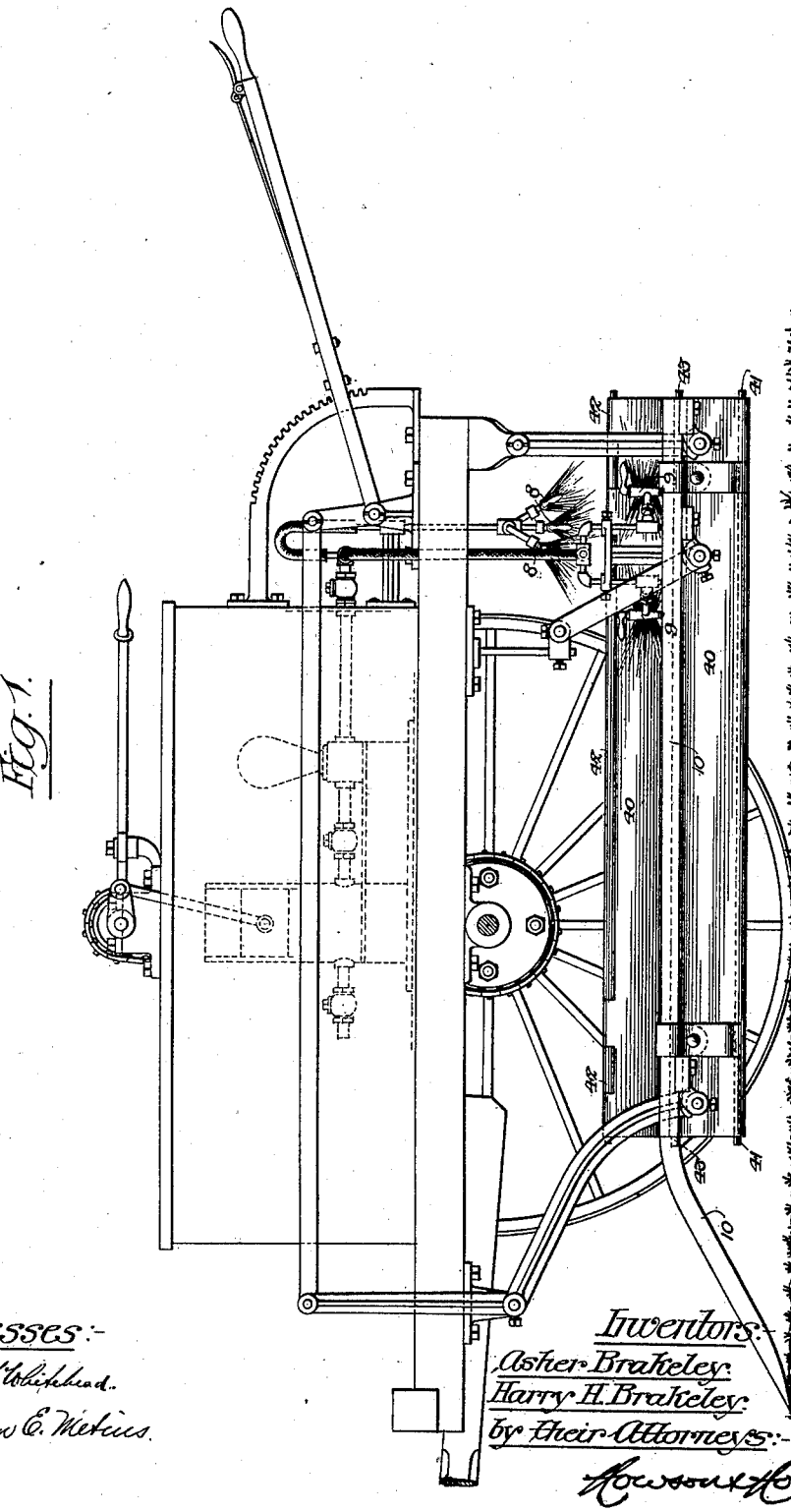

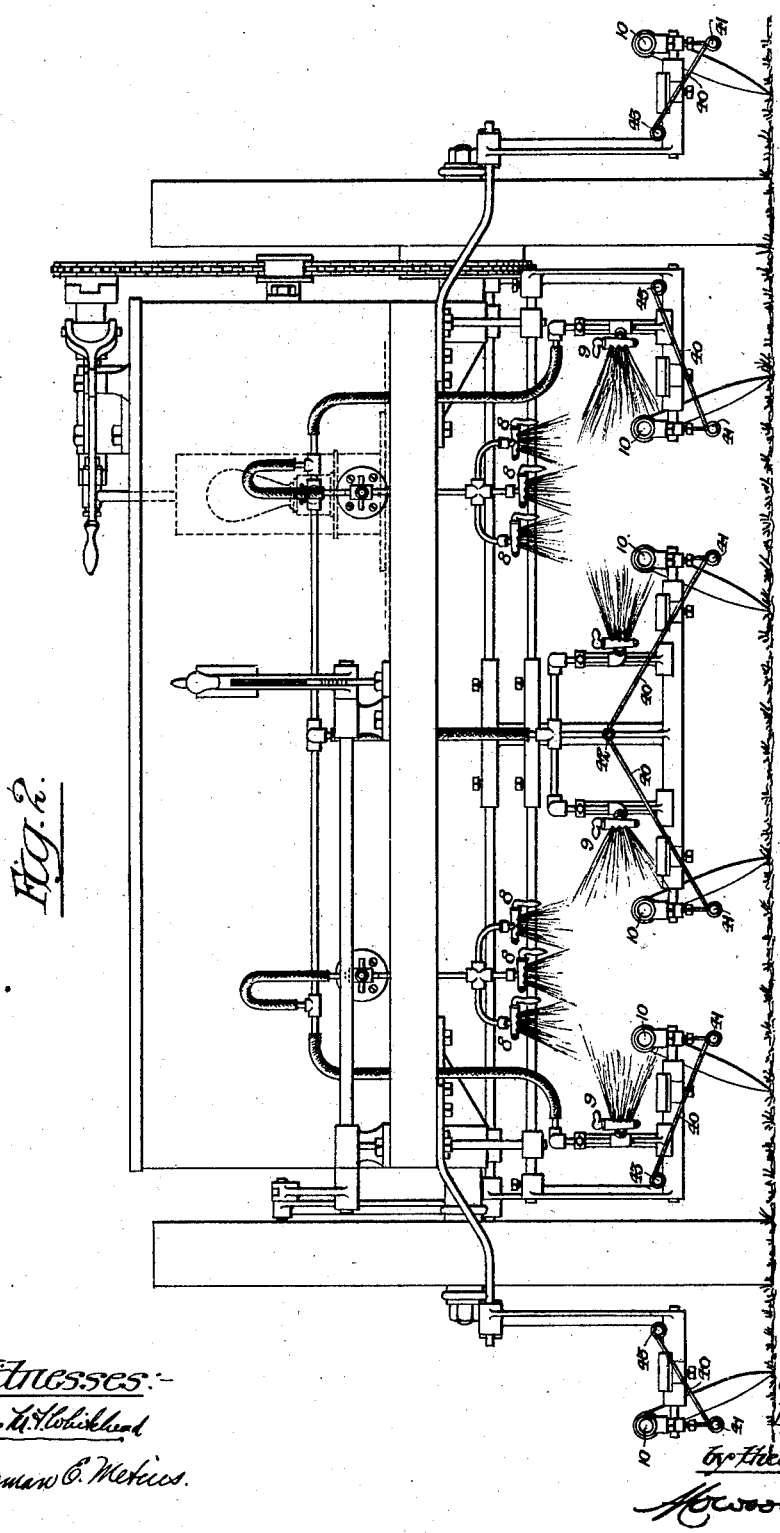

ASHER BRAKELEY AND HARRY H. BRAKELEY, OF BORDENTOWN, NEW JERSEY.

VINE-SPRAYING MACHINE.

SPECIFICATION forming part of Letters Patent No. 669,818, dated March 12, 1901.

Application filed January 8, 1901. Serial No. 42,528. (No model.)

*To all whom it may concern:*

Be it known that we, ASHER BRAKELEY and HARRY H. BRAKELEY, citizens of the United States, and residents of Bordentown, New Jersey, have invented certain Improvements in Vine-Spraying Machines, of which the following is a specification.

Our invention consists of certain improvements in that class of vine-spraying machines in which forcible jets of liquid insecticide are projected onto the vines or plants, instances of such machines being found in the applications for Letters Patent filed by Joseph Brakeley and Harry Brakeley on the 9th day of July, 1900, Serial No. 22,999, and on the 9th day of November, 1900, Serial No. 35,756.

The object of our present improvements is to insure the application of the liquid insecticide to those insect parasites which are dislodged from the vines or plants by the force of the jets of liquid projected onto the latter or by the operation of the lifting-bars, whereby fallen vines or plants are raised from the ground for the action of the spraying-jets. This object we attain in the manner hereinafter set forth, reference being had to the accompanying drawings, in which—

Figure 1 is a side elevation illustrating the application of our invention to a machine of the type shown in the application Serial No. 35,756, and Fig. 2 is an end view of the same.

In the machine constituting the subject of said former application jets of liquid insecticide were projected laterally onto the rows of vines or plants from suitable nozzles 9 and also downward onto the vines or plants through nozzles 8, these nozzles being supplied with the liquid insecticide under pressure from a pump, which derived its supply from an elevated tank mounted upon the wheeled frame of the machine. The vines or plants were lifted for the action of the jets by means of longitudinal bars 10, having downwardly bent or curved front ends and suitably supported from the frame of the machine by means of swinging hangers, so that they could be raised or lowered, the lifter-bars being also adjustable laterally, so as to accommodate themselves to the size of the vines or plants in the row.

It has been found in practice that the operation of lifting the vines or plants and the forcible action of the jets of liquid insecticide have a tendency to dislodge numbers of the insect parasites from said vines or plants before they have received such application of the insecticide as will suffice to kill them, and our present invention has been devised with the view of preventing the escape of these dislodged parasites. This object we attain by providing trays 40 for receiving the parasites thus dislodged and retaining them for such length of time that a killing application of the insecticide thereto will be insured. The trays are preferably mounted upon hangers 41, depending from the lifter-bars 10 and extend upwardly and outwardly in this connection, meaning away from the row of vines or plants which is being acted upon.

Where the machine is constructed, as shown in the drawings, so as to act upon two adjoining rows of vines or plants, a single tray may be interposed between the inner pair of lifting-bars 10, or each of said bars may carry an independent tray of the same character as that shown in connection with the outer lifter-bars 10; but it is preferable to hinge together at the top the trays carried by the inner lifter-bars 10—as shown, for instance, at 42—so as to permit of the lateral adjustment of said bars.

The outer portions of the trays carried by the outer lifter-bars may be supported upon rows or bars 43, suitably mounted upon the fixed structure of the machine.

The spraying of the insecticide upon the parasites deposited upon the trays is effected by means of the ordinary spraying-nozzles of the machine, although special nozzles may be used, if desired.

It will be noted that the trays are inclined downwardly toward the row of vines or plants, so that the parasites saturated with the insecticide will be delivered from the trays close to the row and will thus form along each side of the row a mound or barrier which cannot be safely passed by the live parasites endeavoring to gain access to the vines or plants, such live parasites in the attempt to pass said mound or barrier of dead parasites saturated with the insecticide being likewise saturated and killed.

Having thus described our invention, we claim and desire to secure by Letters Patent—

1. The combination in a vine-spraying machine, of spraying devices for directing jets of liquid insecticide onto the vines or plants, with trays for catching the insect parasites dislodged from the vines or plants by the action of said jets, substantially as specified.

2. The combination in a vine-spraying machine, of the spraying-jets, lifters for raising the vines or plants for the action of said spraying-jets, and trays for collecting the insect parasites dislodged from the vines or plants by the action of said lifting devices, substantially as specified.

3. The combination in a vine-spraying machine, of devices for spraying the vines or plants with liquid insecticide, and trays for collecting insect parasites dislodged from the vines or plants, said trays being disposed so as to discharge alongside of the row of vines or plants, substantially as specified.

4. The combination in a vine-spraying machine, of devices for spraying the vines or plants with liquid insecticide, lifters for raising the vines or plants for the action of such spraying devices, and trays for collecting insect parasites dislodged from the vines or plants, said trays being carried by the lifter, and being expansible and contractible laterally in order to permit lateral adjustment of the lifter, substantially as specified.

5. The combination in a vine-spraying machine, of devices for spraying the vines or plants with liquid insecticide, lifters for raising the vines or plants for the action of such spraying devices, hangers depending from the lifters, and collecting-trays secured to said depending hangers and extending outwardly and upwardly therefrom, substantially as specified.

In testimony whereof we have signed our names to this specification in the presence of two subscribing witnesses.

ASHER BRAKELEY.
HARRY H. BRAKELEY.

Witnesses:
   CHAS. E. BURR,
   SAMUEL E. BURR.